(12) United States Patent
Miyakawa et al.

(10) Patent No.: US 7,963,354 B2
(45) Date of Patent: Jun. 21, 2011

(54) AIR-INLET STRUCTURE FOR MOTORCYCLE

(75) Inventors: Futoshi Miyakawa, Saitama (JP); Yukiya Ueda, Saitama (JP); Katsumi Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 876 days.

(21) Appl. No.: 11/474,468

(22) Filed: Jun. 26, 2006

(65) Prior Publication Data
US 2007/0004329 A1    Jan. 4, 2007

(30) Foreign Application Priority Data

Jun. 30, 2005    (JP) ................................ 2005-193170

(51) Int. Cl.
*B60K 13/02*    (2006.01)
(52) U.S. Cl. .................. 180/68.3; 180/218; 180/219
(58) Field of Classification Search ............... 180/68.3, 180/218, 219, 231
See application file for complete search history.

(56) References Cited

U.S. PATENT DOCUMENTS

| | | | |
|---|---|---|---|
| 3,917,313 A | | 11/1975 | Smith et al. |
| 4,058,181 A | | 11/1977 | Buell |
| 4,445,587 A | * | 5/1984 | Hillman .................. 180/229 |
| 4,607,718 A | * | 8/1986 | Nagataki et al. ............. 180/226 |
| 4,770,460 A | * | 9/1988 | Miura et al. ................. 296/78.1 |
| 4,793,293 A | * | 12/1988 | Minami ...................... 123/41.7 |
| 5,490,573 A | * | 2/1996 | Hagiwara et al. ............ 180/68.1 |
| 6,199,888 B1 | * | 3/2001 | Ito ............................. 280/303 |
| 6,234,531 B1 | * | 5/2001 | Kurayoshi et al. ............ 280/835 |
| 6,251,151 B1 | * | 6/2001 | Kobayashi et al. ............. 55/309 |
| 6,422,332 B1 | * | 7/2002 | Takata et al. .................. 180/68.3 |
| 6,619,415 B1 | * | 9/2003 | Hasumi et al. ................ 180/68.1 |
| 6,857,497 B2 | * | 2/2005 | Sato et al. ...................... 180/312 |
| 7,094,267 B2 | * | 8/2006 | Inayama ....................... 55/385.3 |
| 7,188,695 B2 | * | 3/2007 | Miyakawa et al. ........... 180/219 |
| 7,357,205 B2 | * | 4/2008 | Nishizawa .................... 180/68.3 |

(Continued)

FOREIGN PATENT DOCUMENTS

JP    2000-85664 A    3/2000

(Continued)

OTHER PUBLICATIONS

Images retrieved on May 21, 2010 from www.shopmanualdownloads.com/rip/manImages/full/37-2.jpg showing 1999 Honda CBR600F4 motorcycle.*

Images retrieved on May 21, 2010 from www.houseofhondaparts.com showing 1999-2003 Honda CBR600F4 motorcycle exploded views of upper cowl and frame.*

*Primary Examiner* — Hau V Phan
*Assistant Examiner* — Vaughn T Coolman
(74) *Attorney, Agent, or Firm* — Birch, Stewart, Kolasch & Birch, LLP (57) ABSTRACT

To provide an air-inlet structure of a motorcycle in which air-inlet ducts can be connected to an air box without providing through holes for allowing passage of the air-inlet ducts on the main frame or bending the air-inlet ducts to bypass a main frame. An engine is supported on a pair of left and right front frames that extend from a head pipe that supports a front wheel rearward and downward. An air box supplies air to the engine and is arranged above the engine. Air-inlet ducts introduce air to the air box and extend on the outer sides of the front frames in a fore-and-aft direction of a vehicle body to be connected to an air-inlet port of the air box at the back of the front frames.

20 Claims, 5 Drawing Sheets

U.S. PATENT DOCUMENTS

| | | | |
|---|---|---|---|
| 7,380,630 B2 * | 6/2008 | Yamada et al. | 180/230 |
| 7,387,180 B2 * | 6/2008 | Konno et al. | 180/68.3 |
| 2005/0098142 A1 * | 5/2005 | Nakagome et al. | 123/198 E |
| 2005/0205068 A1 * | 9/2005 | Kurayoshi et al. | 123/472 |

FOREIGN PATENT DOCUMENTS

| | | |
|---|---|---|
| JP | 2002-302083 A | 10/2002 |
| JP | 2004-256005 A | 9/2004 |
| JP | 2005-96761 A | 4/2005 |

* cited by examiner

AIR-INLET STRUCTURE FOR MOTORCYCLE

CROSS-REFERENCE TO RELATED APPLICATIONS

This nonprovisional application claims priority under 35 U.S.C. §119(a) on Patent Application No. 2005-193170, filed in Japan on Jun. 30, 2005, the entirety of which is incorporated herein by reference.

BACKGROUND OF THE INVENTION

1. Field of the Invention

The present invention relates to an air-inlet structure for a motorcycle in which an air-inlet duct is connected to an air box.

2. Description of Background Art

An air-inlet structure for a motorcycle is known, wherein outside air (traveling wind) from the front of a front cowl is introduced into an air box via an air-inlet duct by connecting the air-inlet duct to the air box for supplying air to an engine and extending the air-inlet duct to an outside air introduction port formed on the front cowl (For example, see JP-A-2002-302083).

However, in the structure in the Background Art, the air box is arranged so as to be embraced between a pair of left and right main frames extending from a head pipe of a vehicle. Therefore, it is necessary to provide a through hole on the main frame for allowing passage of the air-inlet duct for connecting the air-inlet duct to the air box. It is also necessary to bend the air-inlet duct to bypass the main frame to an upper side or a lower side thereof when the through hole is not provided. Therefore, there are cases where flexibility in design of the main frame is limited or resistance of intake air is increased corresponding to the extent of bending or extension of the air-inlet duct.

SUMMARY OF THE INVENTION

In view of such circumstances, it is an object of the present invention to provide an air-inlet structure of a motorcycle in which an air-inlet duct can be connected to an air box without providing through holes on the main frame for allowing passage of the air-inlet duct or bending the air-inlet duct so as to bypass the main frame.

In order to solve the problem described above, the present invention provides an air-inlet structure for a motorcycle in which an engine is supported on a pair of left and right main frames extending rearward and downward from a head pipe for supporting a front wheel. An air box for supplying air to the engine is arranged above the engine. Air-inlet ducts for introducing air are connected to the air box. The air-inlet ducts extend along outer sides of the main frames in a fore-and-aft direction of a vehicle body and are connected to air-inlet ports of the air box at the back of the main frame.

According to the invention, the air-inlet ducts extend along the outer sides of the main frames in the fore-and-aft direction of the vehicle body. The air inlet ducts are connected to the air-inlet ports of the air box at the back of the main frame. Therefore, the air-inlet duct can be connected to the air box without providing through holes for allowing passage of the air-inlet ducts on the main frames or bending the air-inlet ducts so as to bypass the main frames.

In this case, the air-inlet ducts extend rearwardly of the vehicle body from air introduction ports on a cowl arranged at the front of the vehicle body so as to be connected to the air-inlet ports of the air box. In this arrangement, air from the front of the cowl, i.e. air that is not affected by heat radiation from the engine, can be supplied into the air box via the air-inlet ducts.

According to another aspect of the present invention, the engine is arranged in such a manner that a cylinder block extends substantially upward from a front portion of a crankcase. The main frames are arranged on the left and right so as to sandwich the cylinder block. The lower ends of the main frames are connected to the engine at the front and rear positions of the cylinder block. The air box is arranged between the main frames. In this arrangement, a force applied from the outside to the front frames is applied from the cylinder block of the engine to the crankcase side. Therefore, the strength required for a cylinder head can be reduced. In addition, weight reduction and lowering of the center of gravity of the engine can further be achieved by downsizing the cylinder head.

It is also possible to arrange a fuel tank above a rear portion of the crankcase and arrange the air box in a space surrounded by the fuel tank on a rear side, by the cylinder block on a lower side, and by the main frames on a front side. In this arrangement, the air box can be arranged to utilize a clearance formed in the vehicle efficiently and hence the entire vehicle body can be downsized.

According to the present invention, the air-inlet ducts extend on the outsides of the main frames in the fore-and-aft direction of the vehicle body and are connected to the air-inlet ports of the air box at the back of the main frames. Therefore, the air-inlet ducts can be connected to the air box without providing the through holes for allowing passage of the air-inlet ducts on the main frames or bending the air-inlet ducts so as to bypass the main frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will now be described with reference to the accompanying drawings, wherein the same or similar elements will be identified with the same reference numerals. In the description, the expressions of direction such as front, rear, left, right, upward, downward represent directions on the basis of the vehicle body.

Figure 1:
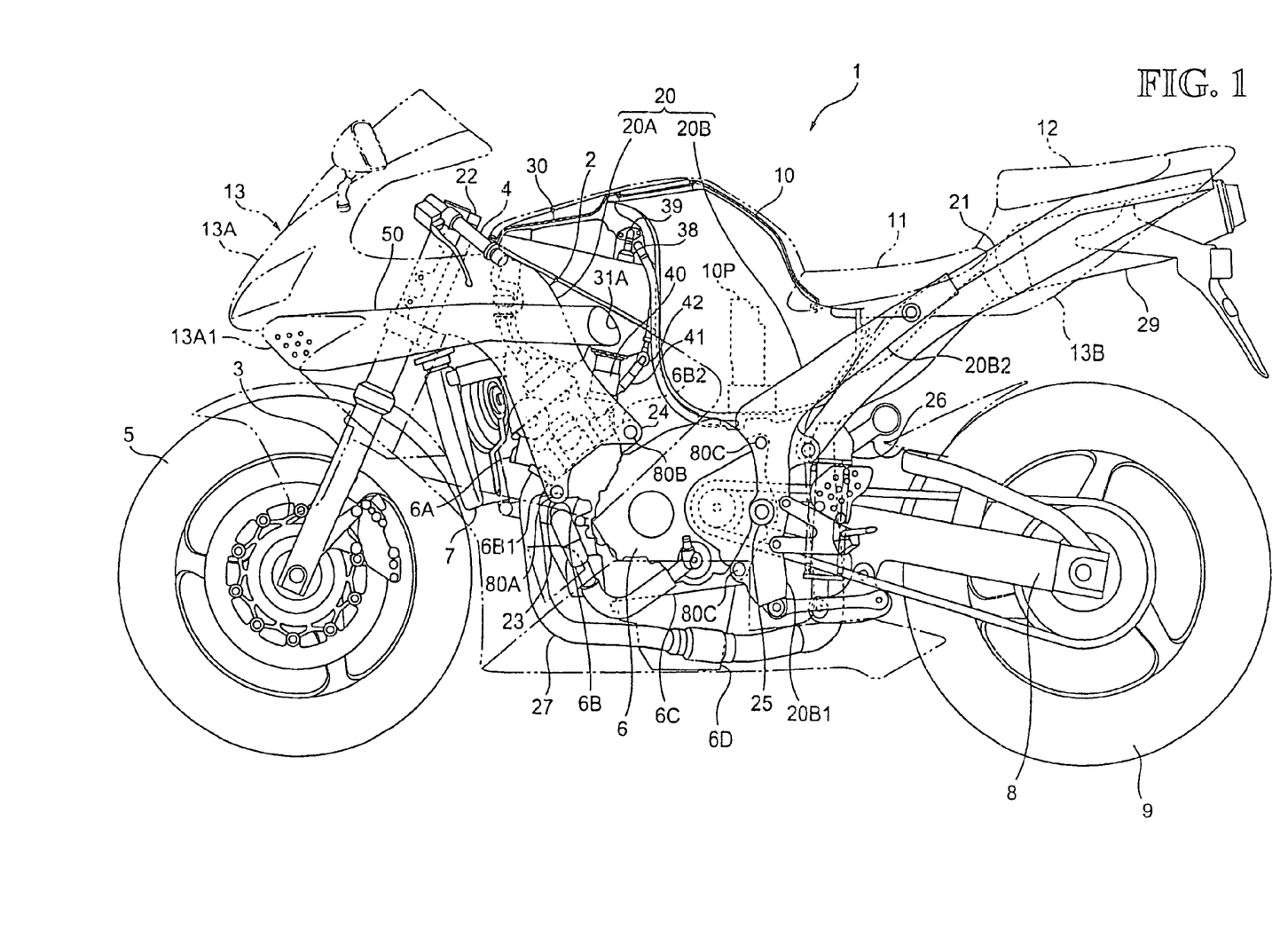
FIG. 1 is a side view showing a general configuration of a motorcycle according to an embodiment of the present invention.

FIG. 1 is a side view showing a general configuration of a motorcycle according to an embodiment of the present invention. The motorcycle 1 includes a vehicle body frame 2. A pair of left and right front forks 3 are rotatably supported by a head pipe 22 of the vehicle body frame 2. A steering handle 4 is attached to upper ends of the front forks 3 and is arranged at an upper portion of a front vehicle body. A front wheel 5 is rotatably supported by the front forks 3. An engine 6 is supported by the vehicle body frame 2 at a substantially center of the vehicle body. A radiator 7 is arranged forwardly of the engine 6. Rear forks 8 are supported by a rear end of the engine 6 and the vehicle body frame 2 so as to be capable of swinging in the vertical direction. A rear wheel 9 is rotatably supported by rear end portions of the rear forks 8. A fuel tank 10 is arranged on an upper portion of the vehicle body frame 2. A front seat 11 is arranged rearwardly of the fuel tank 10 for allowing an operator to sit thereon and a rear seat 12 is arranged rearwardly of the front seat 11 for allowing a fellow passenger to sit thereon. The motorcycle is configured into a full cowling type in which the vehicle body is covered by a cowl 13 substantially entirely.

The vehicle body frame 2 includes a main frame 20 for supporting the engine 6 and the like. A seat rail 21 supports the seats 11, 12 or the like. These members are fabricated by casting or forging metallic materials such as aluminum alloy.

Figure 2:
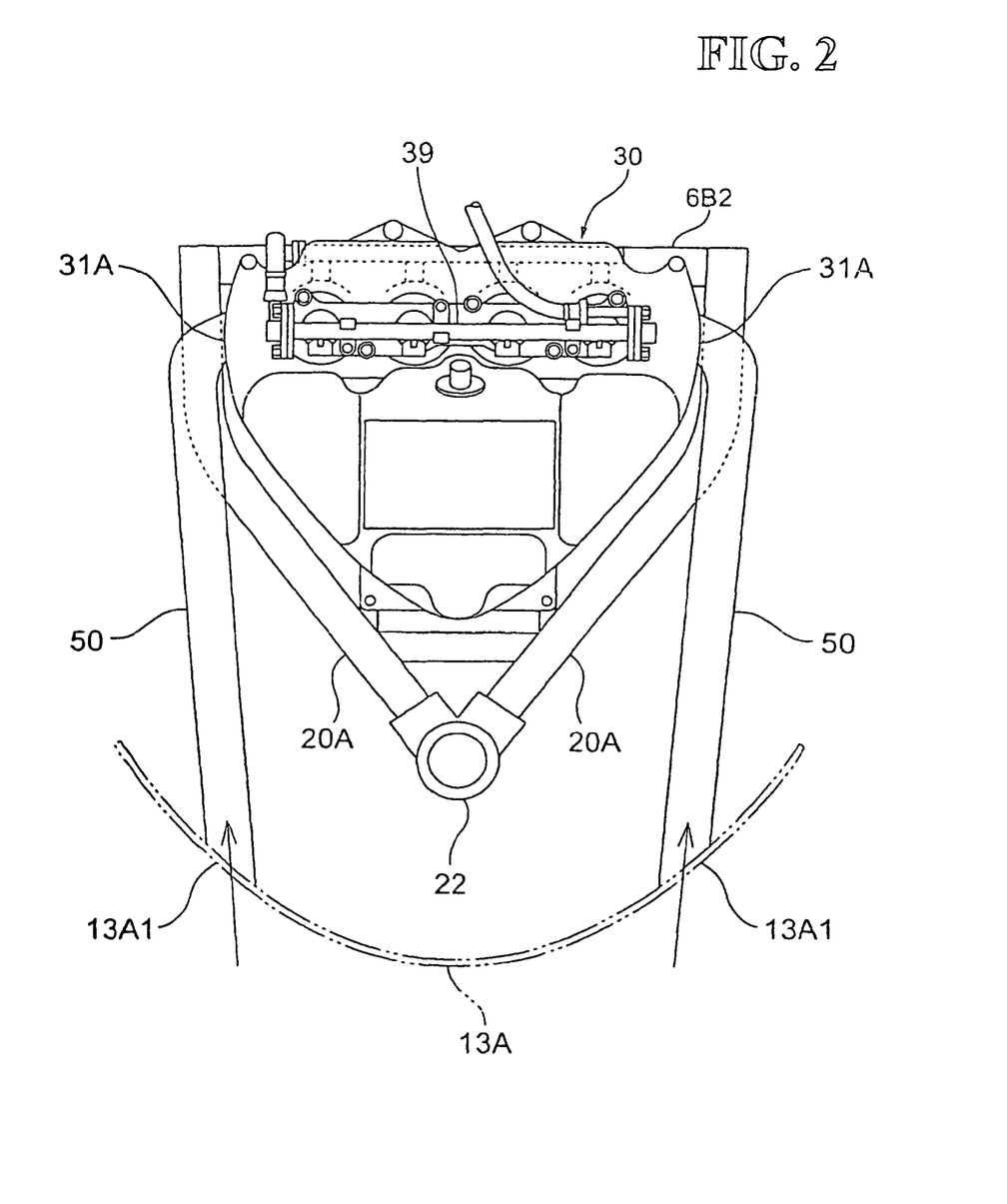
FIG. 2 is an upper view showing a front frame with a peripheral configuration thereof of the motorcycle.
Figure 3:
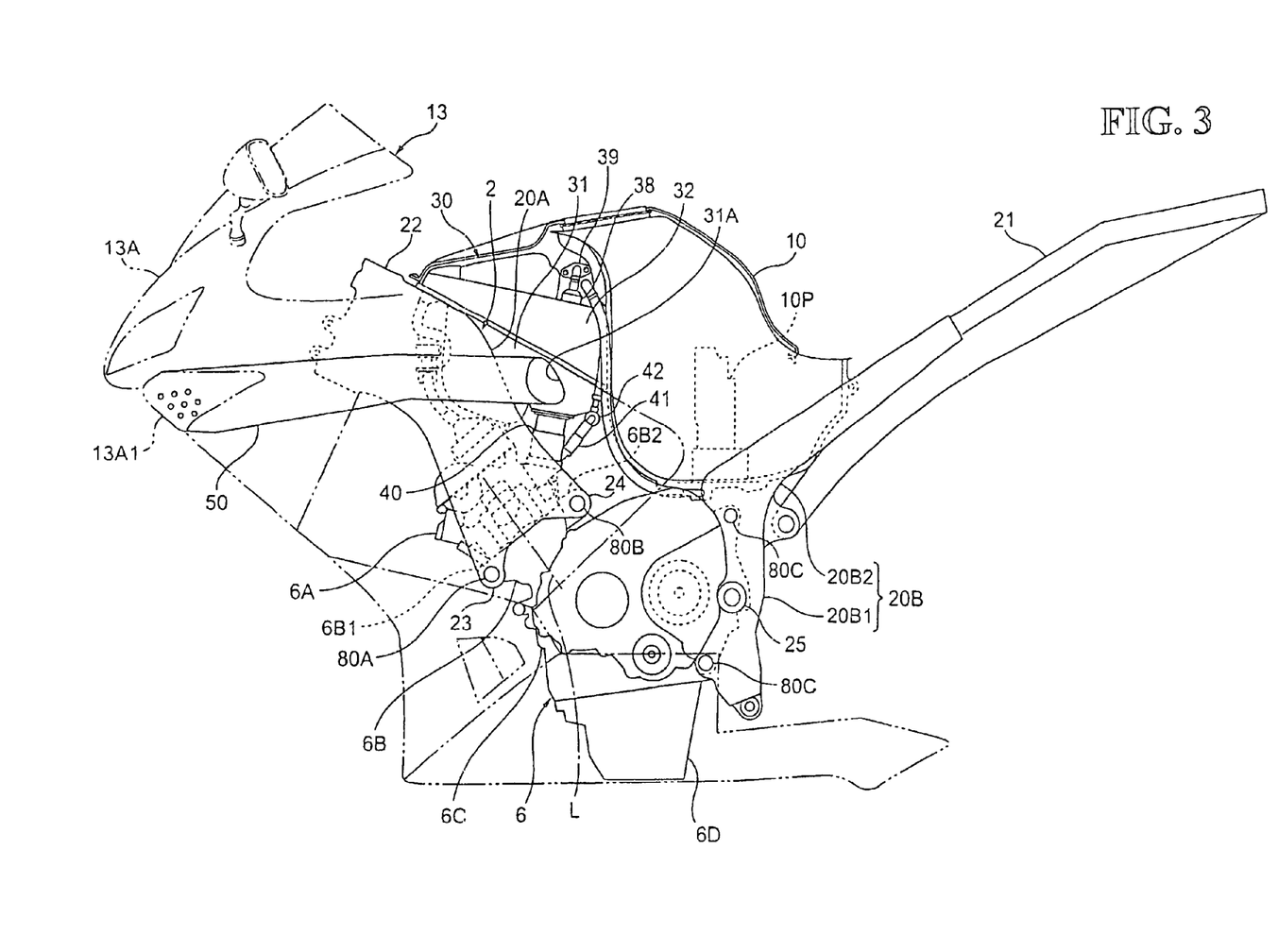
FIG. 3 is a left side view of a vehicle body used for explanation of a vehicle body frame.

The main frame 20 has a divided frame structure including, as shown in FIG. 2, a pair of left and right front frames 20A bifurcated from the head pipe 22 toward the left and right for supporting the engine 6. As shown in FIG. 3, a pair of left and right rear frames 20B is fastened respectively to both sides of a rear portion of the engine 6 for supporting the rear fork 8. More specifically, the front frames 20A are formed into a bent shape that extends rearward and downward at a relatively gentle angle in the vicinity of the head pipe 22. The front frames 20A then extend rearward and downward at an inclination angle larger than the above described inclination angle at a mid position, which is apart from the head pipe 22 by a predetermined distance. Bosses 23, 24 are formed to be directed inward by being projected inwardly of the vehicle body at a front lower end and a rear lower end thereof as shown in FIG. 3.

The pair of front frames 20A extend, as shown in FIG. 2, so as to be apart from each other as they go rearwardly of the vehicle. A downstream side thereof is formed to have a distance slightly larger than the width of a cylinder head 6A of the engine 6 (including a head cover). The cylinder head 6A of the engine 6 is, as shown in FIG. 3, arranged between the pair of front frames 20A. In this state, the bosses 23 at the front lower ends of the front frames 20A are connected to front joint portions 6B1 formed integrally at a front portion of a cylinder block 6B of the engine 6 with bolts 80A. The bosses 24 at the rear lower ends of the front frames 20A are connected to rear joint portions 6B2 formed integrally with the rear portion of the cylinder block 6B with bolts 80B.

The rear frames 20B include fixed portions 20B1 to be fixed to a rear portion of a crankcase 6C of the engine 6 with bolts 80C and extending portions 20B2 extending rearward and upward from upper ends of the fixed portions 20B1. The fixed portions 20B1 are provided with pivots 25. The rear fork 8 is connected to the pivot 25 so as to be capable of swinging in the vertical direction as shown in FIG. 1. A rear cushion unit 26 is mounted to the rear fork 8. The seat rail 21 is mounted to the extending portions 20B2 so as to extend further rearward from the extending portions 20B2. The front seat 11 is mounted to the seat rail 21 at a position rearward of the fuel tank 10. Rear cowls 13B are mounted so as to cover both sides rearward from below the front seat 11. The rear seat 12 is mounted above the rear cowl 13B.

The fuel tank 10 is supported by the rear frames 20B so as to be positioned above the rear portion of the crankcase 6C of the engine 6. An air box 30 is mounted to a clearance surrounded by the fuel tank 10, the cylinder head 6A, and the pair of left and right front frames 20A.

The engine 6 is a parallel 4-cylinder 4-cycle engine (multi-cylinder engine) including the crankcase 6C to which an oil pan 6D is connected. The cylinder block 6B is integrally formed on a front portion of the crankcase 6C. The cylinder head 6A is connected to an upper portion of the cylinder block 6B. Four cylinders are arranged in parallel in the lateral direction in the cylinder block 6B. The engine 6 is formed in such a manner that the cylinder block 6B and the cylinder head 6A are inclined slightly toward the front with respect to the crankcase 6C, whereby the position of the center of gravity of the engine 6 is positioned slightly forward. In FIG. 3, a cylinder axis of the engine 6 is shown by a dashed line L.

A front portion of the cylinder head 6A includes four exhaust pipes 27 connected as shown in FIG. 1. The exhaust pipes 27 extend downwardly of the crankcase 6C, pass rearwardly of the vehicle along the lower side of the crankcase 6C, bound into an exhaust pipe assembly on the rear side of the crankcase 6C, extend upward, and then extend rearward along the seat rail 21. A muffler 29 is connected at the end of the exhaust pipe assembly. The muffler 29 is fixed to the seat rail 21. A heat shielding plate (not shown) is provided around the muffler 29.

A throttle body 40 is connected to a rear portion of the cylinder head 6A. The other end of the throttle body 40 is connected to the air box 30 arranged upwardly of the cylinder head 6A. The throttle body 40 includes four air-inlet passages that are in communication with four air-inlet ports formed in the cylinder head 6A. Each air-inlet passage includes a butterfly valve that opens and closes according to the throttle operation of a user, so that the amounts of air supplied from the air box 30 to the respective cylinders of the engine 6 are controlled by the respective butterfly valves. Four primary injectors 41 are mounted to the throttle body 40 as shown in FIG. 3. A first head pipe 42 to which fuel from a fuel pump 10P in the fuel tank 10 is supplied is connected to the injectors 41. The respective injectors 41 inject fuel supplied to the first head pipe 42 into the respective air-inlet passages of the throttle body 40 by a control of the control unit (not shown). Accordingly, an air-fuel mixture that includes fuel and air mixed together is supplied toward the engine 6 from the throttle body 40.

Figure 4:
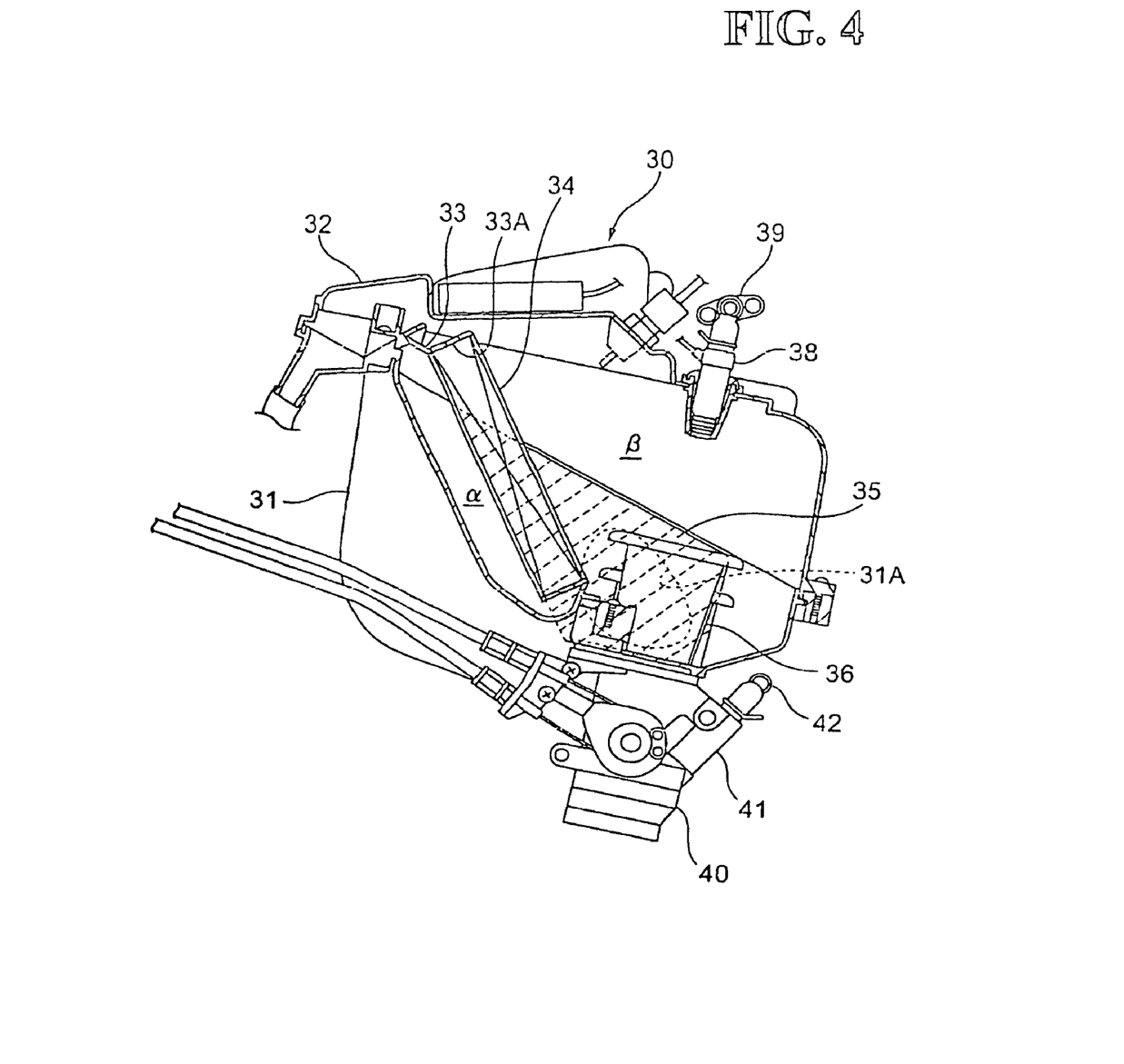
FIG. 4 is a cross-sectional view viewed from the left side of an air box.

The air box 30 includes a case that can be divided into a lower case 31 and an upper case 32 as shown in FIG. 4. The interior of the case is partitioned into an outside-air introducing chamber α and a cleaned air chamber β via a partitioning plate 33 having an opening 33A. The partitioning plate 33 is provided with an air filter 34 mounted at the opening 33A thereof.

Since the front frame 20A is formed into a shape that extends rearward and downward toward the front portion of the engine 6, as show in FIG. 3, rear portions of left and right side walls of the lower case 31 of the air box 30 are exposed to the rear side of the front frame 20A. Air-inlet ports 31A are formed in the exposed areas.

Figure 5:
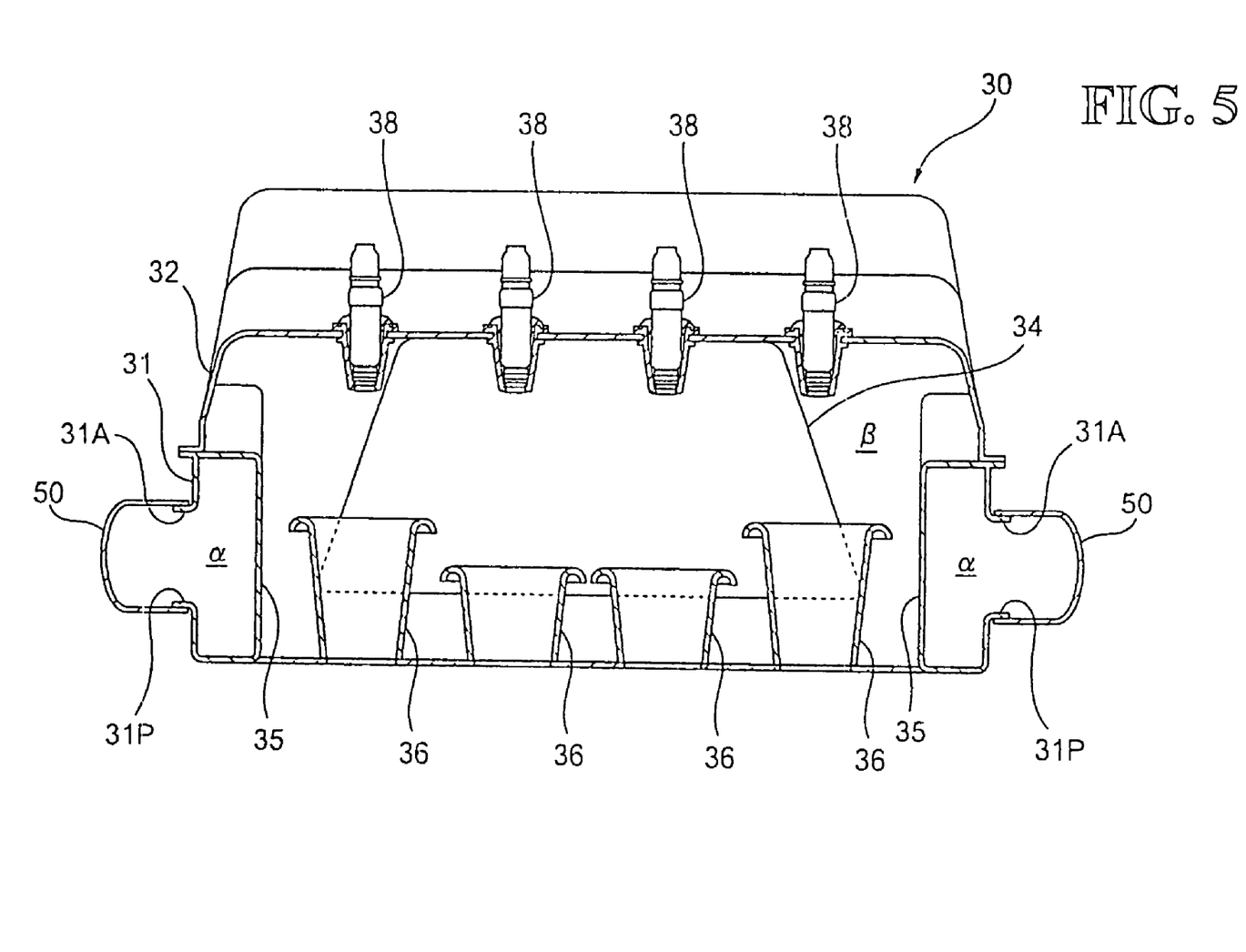
FIG. 5 is a cross-sectional view of the air box viewed from the rear together with air-inlet ducts.

Partitioning walls 35 that partition between inner spaces of the air-inlet ports 31A and the cleaned air chamber β are provided in the interior of the lower case 31 as shown in FIG.

5, and the inner spaces of the air-inlet ports 31A are communicated only to the outside-air introducing chambers α by the partitioning walls 35. Therefore, air introduced from the air-inlet ports 31A is first introduced into the outside-air introducing chambers α, cleaned by being passed through the air filter 34, and introduced into the cleaned air chamber β.

Four air funnels 36 are mounted to a bottom plate of the cleaned air chamber β of the lower case 31 at intervals. The throttle body 40 is connected to lower ends of the respective air funnels 36, so that cleaned air in the cleaned air chamber β is supplied to the throttle body 40 via the respective air funnels 36.

Four secondary injectors 38 are mounted to an upper plate of the upper case 32 at intervals. As shown in FIG. 2, a second head pipe 39 connected to the first head pipe 42 via a fuel hose is connected to the respective injectors 38. The respective injectors 38 inject fuel supplied to the second head pipe 39 by the fuel pump 10P toward the respective air funnels 36. The secondary injectors 38 are driven by the control unit (not shown) when the number of engine revolutions reaches a predetermined number of revolutions and the throttle is opened widely, whereby fuel required for acceleration is quickly supplied and hence the response of the engine 6 is improved.

Air-intake ducts 50 are connected respectively to the air-inlet ports 31A provided on the left and right of the air box 30 as shown in FIG. 1 to FIG. 3. The air-inlet ducts 50 extend in the substantially horizontal direction from air introduction ports 13A1 provided on the left and right of a front cowl 13A rearward of the vehicle. The air inlet ducts 50 then pass along the outsides of the front frames 20A, so that rear ends thereof are connected to the air-inlet ports 31A exposed on the rear side of the front frames 20A.

More specifically, the air-inlet ducts 50 are formed of resin material such as ABS resin. Distal ends of the air inlet ducts 50 are fixed to the front frames 20A so as to be positioned in the vicinity of the left and right air introduction ports 13A1 of the front cowl 13A. The rear ends of the air inlet ducts 50 are fitted into pipe sections 31P (FIG. 5) extending along the edges of the air-inlet ports 31A of the air box 30, so that the air-inlet ducts 50 are connected to the air-inlet ports 31A of the air box 30. The air-inlet ducts 50 are not limited to resin material, and may be formed of resilient material such as rubber or metallic material. Alternatively, the air-inlet ducts 50 are not limited to being configured as a single part by integration molding or the like, and may be configured by connecting a plurality of parts.

Therefore, air (traveling wind) from the front of the vehicle passes through the air introduction port 13A1 of the front cowl 13A, enters into the air-inlet duct 50, is supplied into the air box 30 through the air-inlet duct 50 and the air-inlet port 31A, whereby air which is not affected by heat discharge from the engine 6 can be supplied to the air box 30. In addition, when the vehicle is traveling, air (traveling wind) at a higher pressure than atmospheric pressure is supplied into the air box 30. Therefore, filling efficiency of air-fuel mixture which is to be supplied into the engine 6 can further be enhanced and thus the engine performance can be improved.

In this embodiment, the front frames 20A (main frame 20) extending rearward and downward toward the front portion of the engine 6 from the head pipe 22 and being connected to the engine 6 are provided. The air-inlet ducts 50 extend along the outsides of the front frame 20A in the fore-and-aft direction of the vehicle body and are connected to the air box 30 on the rear sides of the front frames 20A. Therefore, the air-inlet ducts 50 extend in the substantially horizontal direction and are connected to the air box 30 at minimum distance without providing through holes for allowing passage of the air-inlet ducts 50 on the main frame 20 or bending the air-inlet ducts 50 to bypass the main frame 20 to the upper side or the lower side thereof. Consequently, both of improvement of flexibility of design of the main frame 20 and reduction of resistance of intake air in the air-inlet ducts 50 can be achieved.

In this configuration, the front frames 20A are connected to the front portion of the engine 6, and the rear frames 20B are connected to the rear portion of the engine 6. Therefore, an engine 6 of high rigidity can be used as part of the main frame 20. In addition, the main frame 20 can be shortened, and weight reduction of the main frame 20 can be achieved correspondingly. In addition, as shown in FIG. 3, the front frames 20A extend along the cylinder axis L so as to sandwich the cylinder head 6A and the cylinder block 6B of the engine 6, and the lower ends thereof are connected to the engine 6 at the front and rear portions of the cylinder block 6B. Therefore, a force applied from the outside to the front frame 20A is applied to the crankcase 6C side from the cylinder block 6B of the engine 6, and is hardly applied to the cylinder head 6A. Therefore, the cylinder head 6A can hardly be deformed, and hence the strength required for the cylinder head 6A can be lowered correspondingly. Consequently, the cylinder head 6A can be downsized and hence weight reduction and lowering of the center of gravity of the engine 6 can further be achieved.

In this configuration, the air box 30 is arranged in the clearance surrounded by the fuel tank 10, the cylinder block 6B and the cylinder head 6A of the engine 6, and the front frames 20A. Therefore, the clearance can be utilized effectively for arranging the components, and hence the entire vehicle body can be downsized. Since the portion in the periphery of the rear portion of the air box 30 is exposed from the rear sides of the front frames 20A, maintenance of the portion in the vicinity of the throttle body 40 connected to the rear portion of the air box 30 is facilitated. Therefore, for example, replacement of the primary injector 41 can be easily be performed.

Although the present invention has been described on the basis of an embodiment, it is clear that the present invention is not limited thereto. For example, although the case in which the joint portions 6B1, 6B2 to which the front frames 20A are connected are formed on the cylinder block 6B of the engine 6 has been described, the joint portions 6B1, 6B2 can be formed at positions on the crankcase 6C that correspond to the front and rear of the cylinder block 6B.

Although the case in which the present invention is applied to the motorcycle that has the front cowl 13A has been described in the above-described embodiment, it can also be applied to the motorcycle that does not have the front cowl 13A. In this case, the distal ends of the air-inlet ducts 50 may be arranged toward the front of the vehicle. The shape of the air-inlet ducts 50 is not limited to the cylindrical shape, and may be various shapes such as a polygonal tube shape.

Although the main frame 20 is divided into the front frames 20A and the rear frames 20B in the above-described embodiment, it may be a single unit. What is important is that the air-inlet ports 31A of the air box 30 do not interfere with the main frame 20, and hence the air-inlet ports 31A are exposed on the rear side of the main frame 20. In this case, the main frame that extends in the fore-and-aft direction is arranged downwardly of the air box 30. Although the case in which the present invention is applied to the vehicle provided with the parallel 4-cylinder engine has been shown in the above-described embodiment, the invention can be applied to vehicles provided with other types of engine such as a parallel multi-cylinder engine, a single-cylinder engine, or a V-shaped engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air-inlet structure for a motorcycle in which an engine is supported on a pair of left and right main frames extending rearward and downward from a head pipe for supporting a front wheel, comprising:
    an air box for supplying air to the engine, said air box being arranged above the engine and including air-inlet ports; and
    a left air-inlet duct and a right air-inlet duct for introducing air, said air-inlet ducts being connected to the air box, said air-inlet ducts extending along outer sides of the main frames in a fore-and-aft direction of a vehicle body and being connected to the air-inlet ports of the air box at the back of the main frames,
    wherein the leftmost point of the left air-inlet duct is located further left to the leftmost point of the left main frame, and the rightmost point of the right air-inlet duct is located further right to the rightmost point of the right main frame,
    wherein a portion of the left air-inlet duct within a width range of a left air-inlet port of the air-inlet ports and a portion of the left main frame within the width range of the left air-inlet port are overlapped in a top view, and a portion of the right air-inlet duct within a width range of a right air-inlet port of the air-inlet ports and a portion of the right main frame within a width range of the right air-inlet port are overlapped in the top view, and
    wherein the leftmost point of the portion of the left air-inlet duct within the width range of the left air-inlet port is located further left to the leftmost point of the left main frame within the width range of the left air-inlet port, and the rightmost point of the portion of the right air-inlet duct within the width range of the right air-inlet port is located further right to the rightmost point of the portion of the right main frame within the width range of the right air-inlet port.

2. The air-inlet structure for a motorcycle according to claim 1, wherein said air-inlet ducts extend toward a rear portion of the vehicle body from air introduction ports on a cowl arranged at the front of the vehicle body so as to be connected to the air-inlet ports of the air box.

3. The air-inlet structure for a motorcycle according to claim 2, wherein the engine is arranged in such a manner that a cylinder block extends substantially upward from a front portion of a crankcase, the main frames are arranged on the left and right so as to sandwich the cylinder block, lower ends of the main frames are connected to the engine at front and rear positions of the cylinder block, and the air box is arranged between the main frames.

4. The air-inlet structure for a motorcycle according to claim 3, wherein a fuel tank is arranged above a rear portion of a crankcase of the engine and the air box is arranged in a space surrounded by the fuel tank on a rear side, by a cylinder block of the engine on a lower side, and by the main frames on a front side.

5. The air-inlet structure for a motorcycle according to claim 2, wherein a fuel tank is arranged above a rear portion of a crankcase of the engine and the air box is arranged in a space surrounded by the fuel tank on a rear side, by a cylinder block of the engine on a lower side, and by the main frames on a front side.

6. The air-inlet structure for a motorcycle according to claim 1, wherein the engine is arranged in such a manner that a cylinder block extends substantially upward from a front portion of a crankcase, the main frames are arranged on the left and right so as to sandwich the cylinder block, lower ends of the main frames are connected to the engine at front and rear positions of the cylinder block, and the air box is arranged between the main frames.

7. The air-inlet structure for a motorcycle according to claim 6, wherein a fuel tank is arranged above a rear portion of a crankcase of the engine and the air box is arranged in a space surrounded by the fuel tank on a rear side, by a cylinder block of the engine on a lower side, and by the main frames on a front side.

8. The air-inlet structure for a motorcycle according to claim 1, wherein a fuel tank is arranged above a rear portion of a crankcase of the engine and the air box is arranged in a space surrounded by the fuel tank on a rear side, by a cylinder block of the engine on a lower side, and by the main frames on a front side.

9. The air inlet structure for a motorcycle according to claim 1, wherein the air-inlet ducts do not extend through the main frames.

10. The air inlet structure for a motorcycle according to claim 1, wherein said air-inlet ducts include air introduction ports located forward of the head pipe.

11. An air-inlet structure for a vehicle, comprising:
    a pair of main frames extending rearward and downward from a head pipe;
    an engine supported on said pair of main frames;
    an air box for supplying air to the engine, said air box being arranged above the engine; and
    a left air-inlet duct and a right air-inlet duct for introducing air, said air-inlet ducts being connected to the air box at a back of the pair of main frames, said air-inlet ducts extending along outer sides of the main frames in a fore-and-aft direction of the vehicle,
    wherein the leftmost point of the left air-inlet duct is located further left to the leftmost point of the left main frame, and the rightmost point of the right air-inlet duct is located further right to the rightmost point of the right main frame,
    wherein a portion of the left air-inlet duct within a width range of a left air-inlet port of the air box and a portion of the left main frame within the width range of the left air-inlet port are overlapped in a top view, and a portion of the right air-inlet duct within a width range of a right air-inlet port of the air box and a portion of the right main frame within a width range of the right air-inlet port are overlapped in the top view, and
    wherein the leftmost point of the portion of the left air-inlet duct within the width range of the left air-inlet port is located further left to the leftmost point of the left main frame within the width range of the left air-inlet port, and the rightmost point of the portion of the right air-inlet duct within the width range of the right air-inlet port is located further right to the rightmost point of the portion of the right main frame within the width range of the right air-inlet port.

12. The air-inlet structure for a vehicle according to claim 11, wherein said air-inlet ducts extend toward a rear portion of the vehicle from air introduction ports on a cowl arranged at the front of the vehicle so as to be connected to air-inlet ports of the air box.

13. The air-inlet structure for a vehicle according to claim 12, wherein the engine is arranged such that a cylinder block thereof extends substantially upward from a front portion of a crankcase, the pair of main frames are arranged on the left and right so as to sandwich the cylinder block therebetween, lower ends of the pair of main frames are connected to the engine at front and rear positions of the cylinder block, and the air box is arranged between the pair of main frames.

14. The air-inlet structure for a vehicle according to claim 13, wherein a fuel tank is arranged above a rear portion of a crankcase of the engine and the air box is arranged in a space surrounded by the fuel tank on a rear side, by a cylinder block of the engine on a lower side, and by the pair of main frames on a front side.

15. The air-inlet structure for a vehicle according to claim 12, wherein a fuel tank is arranged above a rear portion of a crankcase of the engine and the air box is arranged in a space surrounded by the fuel tank on a rear side, by a cylinder block of the engine on a lower side, and by the pair of main frames on a front side.

16. The air-inlet structure for a vehicle according to claim 11, wherein the engine is arranged such that a cylinder block thereof extends substantially upward from a front portion of a crankcase, the pair of main frames are arranged on the left and right so as to sandwich the cylinder block therebetween, lower ends of the pair of main frames are connected to the engine at front and rear positions of the cylinder block, and the air box is arranged between the pair of main frames.

17. The air-inlet structure for a vehicle according to claim 16, wherein a fuel tank is arranged above a rear portion of a crankcase of the engine and the air box is arranged in a space surrounded by the fuel tank on a rear side, by a cylinder block of the engine on a lower side, and by the pair of main frames on a front side.

18. The air-inlet structure for a vehicle according to claim 11, wherein a fuel tank is arranged above a rear portion of a crankcase of the engine and the air box is arranged in a space surrounded by the fuel tank on a rear side, by a cylinder block of the engine on a lower side, and by the pair of main frames on a front side.

19. The air inlet structure for a vehicle according to claim 11, wherein the air-inlet ducts do not extend through the pair of main frames.

20. The air inlet structure for a vehicle according to claim 11, wherein said air-inlet ducts include air introduction ports located forward of the head pipe.

* * * * *